(12) United States Patent
Guo et al.

(10) Patent No.: US 11,419,027 B2
(45) Date of Patent: Aug. 16, 2022

(54) USER PLANE LINK ESTABLISHMENT METHOD, BASE STATION, AND MOBILITY MANAGEMENT DEVICE

(71) Applicant: HUAWEI TECHNOLOGIES CO., LTD., Guangdong (CN)

(72) Inventors: Wei Guo, Shanghai (CN); Lan Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/672,642

(22) Filed: Nov. 4, 2019

(65) Prior Publication Data

US 2020/0068466 A1 Feb. 27, 2020

Related U.S. Application Data

(63) Continuation of application No. PCT/CN2018/085043, filed on Apr. 28, 2018.

(30) Foreign Application Priority Data

May 4, 2017 (CN) .......................... 201710309637.2

(51) Int. Cl.
*H04W 36/08* (2009.01)
*H04W 8/14* (2009.01)
*H04W 36/00* (2009.01)

(52) U.S. Cl.
CPC ............. *H04W 36/08* (2013.01); *H04W 8/14* (2013.01); *H04W 36/0033* (2013.01); *H04W 36/0055* (2013.01)

(58) Field of Classification Search
CPC ... H04W 36/08; H04W 8/14; H04W 36/0033; H04W 36/0055; H04W 76/12
See application file for complete search history.

(56) References Cited

U.S. PATENT DOCUMENTS

| 2010/0113022 A1* | 5/2010 | Motegi ............. H04W 36/0055 455/436 |
| 2011/0075675 A1* | 3/2011 | Koodli ................ H04L 12/1485 370/401 |

(Continued)

FOREIGN PATENT DOCUMENTS

| CN | 102083051 A | 6/2011 |
| CN | 104661205 A | 5/2015 |

(Continued)

OTHER PUBLICATIONS

Intel Corporation, "Support of light connection procedure," 3GPP TSG RAN WG3 Meeting #94, R3-162794, Reno, USA, Nov. 14-18, 2016, 8 pages.

(Continued)

*Primary Examiner* — Jackie Zuniga Abad
(74) *Attorney, Agent, or Firm* — Fish & Richardson P.C.

(57) ABSTRACT

The present disclosure relates to user plane link establishment methods. One example method includes sending, by a first base station, an obtaining request associated with user equipment to a second base station, receiving, by the first base station, a response message corresponding to the obtaining request, where the response message includes a peer address associated with the user equipment, and establishing, by the first base station and based on the peer address, a user plane link corresponding to the user equipment.

14 Claims, 4 Drawing Sheets

(56) References Cited

U.S. PATENT DOCUMENTS

| | | | |
|---|---|---|---|
| 2015/0085845 A1* | 3/2015 | Wang | H04W 76/14 370/338 |
| 2016/0295476 A1 | 10/2016 | Bi et al. | |
| 2020/0100088 A1* | 3/2020 | Kim | H04W 88/04 |

FOREIGN PATENT DOCUMENTS

| | | |
|---|---|---|
| CN | 107257553 A | 10/2017 |
| EP | 2906009 A1 | 8/2015 |
| WO | 2015018074 A1 | 2/2015 |

OTHER PUBLICATIONS

3GPP TS 36.300 V13.5.0 (Sep. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2( Release 13)," Sep. 2016, 313 pages.

Oualcomm Incorporated, "RRC inactive and RAN paging end-to-end behaviour," 3GPP SA WG2 Meeting #118, S2-166537, Reno, US, XP051185096, Nov. 14-18, 2016, 10 pages.

Ericsson, "Corrections to C-IoT optimisations in Stage-2," 3GPP TSG-RAN WG2 Meeting #95, R2-165844, Gothenburg, Sweden, XP051161234, Sep. 22-26, 2016, 12 pages.

Extended European Search Report issued in European Application No. 18795218.9 dated Mar. 9, 2020, 11 pages.

Office Action issued in Chinese Application No. 201710309637.2 dated Apr. 19, 2019, 21 pages (with English translation).

PCT International Search Report and Written Opinion issued in International Application No. PCT/CN2018/085043 dated Jun. 25, 2018, 18 pages (with English translation).

EPO Communication pursuant to Article 94(3) EPC issued in European Application No. 18795218.9 dated Jun. 16, 2021, 3 pages.

ETSI TS 136 300 V13.5.0 (Dec. 2016), "LTE; Evolved Universal Terrestrial Radio Access (E-UTRA) and Evolved Universal Terrestrial Radio Access Network (E-UTRAN); Overall description; Stage 2 (3GPP TS 36.300 version 13.5.0 Release 13)," Dec. 2016, 328 pages.

Office Action issued in Korean Application No. 2019-7035010 dated Jun. 28, 2021, 8 pages (with English translation).

* cited by examiner

———————User plane
— — — — —Control plane

USER PLANE LINK ESTABLISHMENT METHOD, BASE STATION, AND MOBILITY MANAGEMENT DEVICE

CROSS-REFERENCE TO RELATED APPLICATIONS

This application is a continuation of International Application No. PCT/CN2018/085043, filed on Apr. 28, 2018, which claims priority to Chinese Patent Application No. 201710309637.2, filed on May 4, 2017. The disclosures of the aforementioned applications are hereby incorporated by reference in their entireties.

TECHNICAL FIELD

This application relates to the communications field, and in particular, to a user plane link establishment method, a base station, and a mobility management device.

BACKGROUND

A narrowband internet of things (Narrow Band Internet of Things, NB-IoT) is a technical standard defined by a 3rd generation partnership project (3rd Generation Partnership Project, 3GPP) standard organization, and is a narrowband radio frequency technology specially designed for an internet of things. The NB-IoT is constructed based on a cellular network and consumes a bandwidth only about 180 kHz. The NB-IoT may be directly deployed in a network such as a global system for mobile communications (Global System for Mobile Communications, GSM), a universal mobile communications system (Universal Mobile Telecommunications System, UMTS), and long term evolution (Long Term Evolution, LTE).

In a narrowband internet of things protocol, after being suspended (Suspend) at a site, narrowband user equipment (User Equipment) may be resumed (Resume) at another site, namely, a non-suspend site. To be specific, the user equipment is resumed to a status before suspension. This process is referred to as cross-site resumption.

In the prior art, during the cross-site resumption, a target base station (namely, a non-suspend site) sends a retrieve UE context request (retrieve UE context request) to a source base station (namely, a suspend site), and then the source base station returns UE context information to the target base station. Then, the target base station may resume the status of the user equipment based on the UE context information.

However, in a process in which the target base station resumes the status of the user equipment in the prior art, the target base station does not know how to resume a user plane link corresponding to the user equipment, and consequently, the user equipment cannot normally transmit service data.

SUMMARY

A first aspect of embodiment of this application provides a user plane link establishment method, and the method includes:

When a first base station needs to resume user equipment in a suspend state, the first base station sends an obtaining request to a second base station, and then the first base station receives a response message returned by the second base station. The response message includes a peer address. The first base station establishes, based on the peer address, a user plane link corresponding to the user equipment.

It should be understood that the peer address is an address of a core network element connected to the base station on a user plane that corresponds to the user equipment. Specifically, in an LTE network, the peer address is a peer address of an S1-U interface.

In this embodiment of this application, in a process in which the first base station resumes a status of the suspended user equipment, the first base station may obtain the peer address, and establish, based on the peer address, the user plane link corresponding to the user equipment, so that the user equipment can normally transmit service data.

With reference to the first aspect of the embodiments of this application, in a first implementation of the first aspect of the embodiments of this application, the response message may include an extension information element, and the extension information element is used to indicate the peer address.

This embodiment of this application provides a specific manner of indicating the peer address, thereby improving implementability of the solution.

With reference to the first implementation of the first aspect of the embodiments of this application, in a second implementation of the first aspect of the embodiments of this application, the extension information element is uplink GTP tunnel node information.

It should be understood that an uplink GTP tunnel node is defined as an SGW node connected to an S1 interface in an abstract syntax notation protocol, and the node is used to transmit an uplink packet data unit.

In this embodiment of this application, the peer address may be indicated by using the uplink GTP tunnel node information, and there is no need to define an additional extension information element, so that complexity of implementing the solution is reduced. With reference to the first aspect, or the first or the second implementation of the first aspect of the embodiments of this application, in a third implementation of the first aspect of the embodiments of this application, the peer address may include an IP address of the SGW. This embodiment of this application provides a specific implementation for establishing the user plane link, thereby improving implementability of the solution.

With reference to the first or the second implementation of the first aspect of the embodiments of this application, in a fourth implementation of the first aspect of the embodiments of this application, the obtaining request is used to obtain context information of the user equipment, and the response message includes the context information of the user equipment. In this case, the extension information element is an information element in the context information.

A second aspect of the embodiments of this application provides a user plane link establishment method, and the method includes:

When a first base station needs to resume user equipment in a suspend state, the first base station sends a retrieve UE context request to a second base station. After the second base station returns context information of the user equipment to the first base station, the first base station sends, to a mobility management device, a link switch request corresponding to the user equipment. After updating user plane link information of the user equipment based on the link switch request, the mobility management device returns an acknowledgement message to the first base station. The acknowledgement message includes a peer address. The first base station receives the acknowledgement message, and establishes, based on the peer address, a user plane link corresponding to the user equipment.

It should be understood that the peer address is an address of a core network element connected to the base station on a user plane that corresponds to the user equipment. Specifically, in an LTE network, the peer address is a peer address of an S1-U interface. In this embodiment of this application, in a process in which the first base station resumes a status of the user equipment, the mobility management device sends the peer address to the first base station, so that the first base station can establish, based on the peer address, the user plane link corresponding to the user equipment, and the user equipment can normally transmit service data.

With reference to the second aspect of the embodiments of this application, in a first implementation of the second aspect of the embodiments of this application, the peer address may include an Internet protocol address of a serving gateway.

This embodiment of this application provides a specific implementation for establishing the user plane link, thereby improving implementability of the solution.

A third aspect of the embodiments of this application provides a user plane link establishment method, and the method includes:

When a first base station needs to resume user equipment in a suspend state, the first base station sends an obtaining request to a second base station. The second base station receives the obtaining request, determines a peer address based on the obtaining request, and then sends a response message including the peer address to the first base station, so that the first base station can establish a user plane link based on the peer address.

It should be understood that the peer address is an address of a core network element connected to the base station on a user plane that corresponds to the user equipment. Specifically, in an LTE network, the peer address is a peer address of an S1-U interface.

In this embodiment of this application, in a process in which the first base station resumes a status of the user equipment, the second base station sends the peer address to the first base station, so that the first base station can establish, based on the peer address, the user plane link corresponding to the user equipment, and the user equipment can normally transmit service data.

With reference to the third aspect of the embodiments of this application, in a first implementation of the third aspect of the embodiments of this application, before sending the response message, the second base station further performs the following step:

The second base station adds, to the response message, an extension information element used to indicate the peer address.

This embodiment of this application provides a specific implementation for indicating the peer address, thereby improving implementability of the solution.

With reference to the first implementation of the third aspect of the embodiments of this application, in a second implementation of the third aspect of the embodiments of this application, the extension information element is uplink GTP tunnel node information. It should be understood that an uplink GTP tunnel node is defined as an SGW node connected to an S1 interface in an abstract syntax notation protocol, and the node is used to transmit an uplink packet data unit.

In this embodiment of this application, the peer address may be indicated by using the uplink GTP tunnel node information, and there is no need to define an additional extension information element, so that complexity of implementing the solution is reduced.

With reference to the first or the second implementation of the third aspect of the embodiments of this application, in a third implementation of the third aspect of the embodiments of this application, the obtaining request is used to obtain context information of the user equipment, and the response message includes the context information of the user equipment. In this case, the extension information element is an information element in the context information.

With reference to the third aspect, or the first or the second implementation of the third aspect of the embodiments of this application, in a fourth implementation of the third aspect of the embodiments of this application, the peer address may include an Internet protocol address of the serving gateway.

A fourth aspect of the embodiments of this application provides a base station, and the base station includes: a sending module, configured to send an obtaining request to a second base station;

a receiving module, configured to receive a response message corresponding to the obtaining request, where the response message includes a peer address; and a processing module, configured to establish, based on the peer address received by the receiving module, a user plane link corresponding to user equipment.

With reference to the fourth aspect of the embodiments of this application, in a first implementation of the fourth aspect of the embodiments of this application, the response message may include an extension information element, and the extension information element is used to indicate the peer address.

With reference to the first implementation of the fourth aspect of the embodiments of this application, in a second implementation of the fourth aspect of the embodiments of this application, the extension information element may include uplink GTP tunnel node information.

With reference to the fourth aspect, or the first or the second implementation of the fourth aspect of the embodiments of this application, in a third implementation of the fourth aspect of the embodiments of this application, the peer address may include an Internet protocol address of a serving gateway.

With reference to the first or the second implementation of the fourth aspect of the embodiments of this application, in a fourth implementation of the fourth aspect of the embodiments of this application, the response message includes context information of the user equipment, and the extension information element is an information element in the context information.

A fifth aspect of the embodiments of this application provides a base station, and the base station includes:

a sending module, configured to send, to a mobility management device MME, a link switch request corresponding to user equipment;

a receiving module, configured to receive an acknowledgement message corresponding to the link switch request, where the acknowledgement message includes a peer address; and an establishment module, configured to establish, based on the peer address received by the receiving module, a user plane link corresponding to the user equipment.

With reference to the fifth aspect of the embodiments of this application, in a first implementation of the fifth aspect of the embodiments of this application, the peer address may include an IP address of an SGW.

A sixth aspect of the embodiments of this application provides a base station, and the base station includes:

a receiving module, configured to receive an obtaining request sent by a first base station;

a determining module, configured to determine a peer address based on the obtaining request received by the receiving module; and a sending module, configured to send a response message to the first base station, where the response message includes the peer address.

With reference to the sixth aspect of the embodiments of this application, in a first implementation of the sixth aspect of the embodiments of this application, the base station further includes:

a carrying module, configured to add an extension information element to the response message, where the extension information element is used to indicate the peer address.

With reference to the first implementation of the sixth aspect of the embodiments of this application, in a second implementation of the sixth aspect of the embodiments of this application, the extension information element is uplink GTP tunnel node information.

With reference to the sixth aspect, or the first or the second implementation of the sixth aspect of the embodiments of this application, in a third implementation of the sixth aspect of the embodiments of this application, the peer address includes an Internet protocol address of a serving gateway.

With reference to the first or the second implementation of the sixth aspect of the embodiments of this application, in a fourth implementation of the sixth aspect of the embodiments of this application, the response message includes context information of the user equipment, and the extension information element is an information element in the context information.

A seventh aspect of the embodiments of this application provides a base station, and the base station includes: a transceiver, a memory, and a processor.

The memory is configured to store a program.

The processor is configured to execute the program in the memory, and to perform the following steps:

controlling the transceiver to send an obtaining request to a second base station;

controlling the transceiver to receive a response message corresponding to the obtaining request, where the response message includes a peer address; and establishing, based on the peer address, a user plane link corresponding to user equipment.

With reference to the seventh aspect of the embodiments of this application, in a first implementation of the seventh aspect of the embodiments of this application, the response message may include an extension information element, and the extension information element is used to indicate the peer address.

With reference to the first implementation of the seventh aspect of the embodiments of this application, in a second implementation of the seventh aspect of the embodiments of this application, the extension information element may include uplink GTP tunnel node information.

With reference to the seventh aspect, or the first or the second implementation of the seventh aspect of the embodiments of this application, in a third implementation of the seventh aspect of the embodiments of this application, the peer address includes an Internet protocol address of a serving gateway.

With reference to the first or the second implementation of the seventh aspect of the embodiments of this application, in a fourth implementation of the seventh aspect of the embodiments of this application, the response message includes context information of the user equipment, and the extension information element is an information element in the context information.

An eighth aspect of the embodiments of this application provides a base station, and the base station includes: a transceiver, a memory, and a processor.

The memory is configured to store a program.

The processor is configured to execute the program in the memory, and to perform the following steps:

controlling the transceiver to send, to an MME, a link switch request corresponding to user equipment;

controlling the transceiver to receive an acknowledgement message corresponding to the link switch request, where the acknowledgement message includes a peer address; and establishing, based on the peer address, a user plane link corresponding to the user equipment.

With reference to the eighth aspect of the embodiments of this application, in a first implementation of the eighth aspect of the embodiments of this application, the peer address may include an Internet protocol address of a serving gateway.

A ninth aspect of the embodiments of this application provides a base station, and the base station includes: a transceiver, a memory, and a processor.

The memory is configured to store a program.

The processor is configured to execute the program in the memory, and to perform the following steps:

controlling the transceiver to receive an obtaining request sent by a first base station;

determining a peer address based on the obtaining request; and controlling the transceiver to send a response message to the first base station, where the response message includes the peer address.

With reference to the ninth aspect of the embodiments of this application, in a first implementation of the ninth aspect of the embodiments of this application, the processor is further configured to perform the following step:

adding an extension information element to the response message, where the extension information element is used to indicate the peer address.

With reference to the first implementation of the ninth aspect of the embodiments of this application, in a second implementation of the ninth aspect of the embodiments of this application, the extension information element is uplink GTP tunnel node information.

With reference to the ninth aspect, or the first or the second implementation of the ninth aspect of the embodiments of this application, in a third implementation of the ninth aspect of the embodiments of this application, the peer address includes an Internet protocol address of a serving gateway.

With reference to the first or the second implementation of the ninth aspect of the embodiments of this application, in a fourth implementation of the ninth aspect of the embodiments of this application, the response message includes context information of the user equipment, and the extension information element is an information element in the context information.

A tenth aspect of the embodiments of this application provides a computer-readable storage medium. The computer-readable storage medium stores an instruction, and when the instruction runs on a computer, the computer is enabled to perform the methods according to the first aspect to the third aspect.

An eleventh aspect of the embodiments of this application provides a computer program product including an instruction. When the computer program product runs on a computer, the computer is enabled to perform the methods according to the first aspect to the third aspect.

It can be learned from the foregoing technical solutions that the embodiments of this application have the following advantages:

In the embodiments of this application, in a process in which the first base station resumes the status of the suspended user equipment, the first base station may obtain the peer address, and establish, based on the peer address, the user plane link corresponding to the user equipment, so that the user equipment can normally transmit service data.

BRIEF DESCRIPTION OF DRAWINGS

To describe the technical solutions in the embodiments of this application more clearly, the following briefly describes the accompanying drawings in the embodiments. Apparently, the accompanying drawings in the following description show only some embodiments of this application.

DESCRIPTION OF EMBODIMENTS

Figure 1:
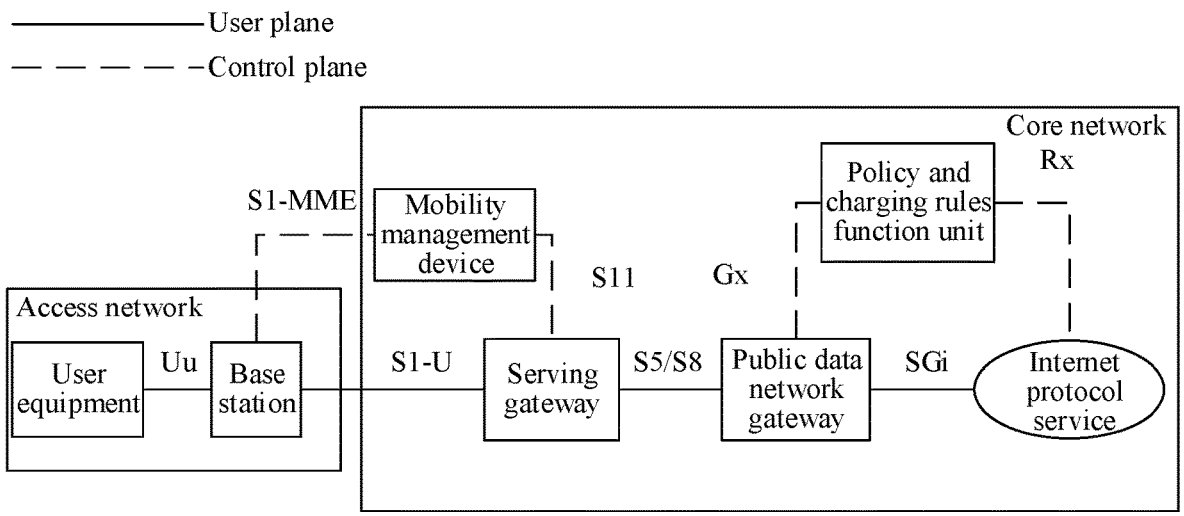
FIG. 1 is a schematic diagram of an embodiment of a user plane link establishment system according to an embodiment of this application.

The following clearly describes the technical solutions in the embodiments of this application with reference to the accompanying drawings in the embodiments of this application. Apparently, the described embodiments are merely some but not all of the embodiments of this application.

In the specification, claims, and accompanying drawings of this application, terms "first", "second", "third", "fourth", and so on (if existent) are intended to distinguish between similar objects but do not necessarily indicate a specific order or sequence. It should be understood that data termed in such a way is interchangeable in proper situations so that the embodiments of this application described herein can be implemented in an order other than the order illustrated or described herein. In addition, terms "include", "have" and any variants of the terms mean to cover the non-exclusive inclusion, for example, processes, methods, systems, products, or devices that include a series of steps or units are not necessarily limited to those clearly listed steps or units, but may include other steps or units that are not clearly listed or that are inherent to these processes, methods, products, or devices.

The embodiments of this application provide a user plane link establishment method, to establish a valid user plane link in a cross-site resumption scenario, so that user equipment normally transmits service data.

It should be understood that the user plane link establishment method, a base station, and a mobility management device in the embodiments of this application may be applied to various communications systems, for example, a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunication system (Universal Mobile Telecommunication System, UMTS), a worldwide interoperability for microwave access (Worldwide Interoperability for Microwave Access, WiMAX) communications system, a 5th generation (5th-Generation, 5G) mobile communications system, or a subsequent evolved mobile communications system.

It should be understood that the user equipment in the embodiments of this application includes but is not limited to a mobile station (Mobile Station, MS), a mobile terminal (Mobile Terminal), a mobile phone (Mobile Telephone), a handset (handset), portable equipment (portable equipment), and the like. The user equipment may communicate with one or more core networks by using a radio access network (Radio Access Network, RAN). For example, the user equipment may be a mobile phone (or referred to as a "cellular" phone), or a computer having a wireless communication function. Alternatively, the user equipment may be a portable, pocket-sized, handheld, computer built-in, or vehicle-mounted mobile apparatus.

The base station in the embodiments of this application may be a base transceiver station (Base Transceiver Station, BTS) in the GSM or CDMA, or a NodeB (NodeB) in WCDMA, or an evolved NodeB (evolved NodeB, eNB or e-NodeB) in LTE. This is not limited in the embodiments of this application.

To facilitate understanding of the embodiments of this application, the following describes a technical background of the embodiments of this application.

In a narrowband internet of things scenario, there is a suspend-resume (suspend-resume) mechanism between the base station and the UE. A purpose of the mechanism is to reduce a quantity of information that needs to be exchanged during switching of the UE between a radio resource control (Radio Resource Control, RRC) connected mode (connected mode) and a radio resource control (Radio Resource Control, RRC) idle mode (idle mode), to reduce energy consumption of the UE. Specifically, when the user equipment does not need an RRC connection, the base station may send a release message to the user equipment. The release message includes a resume (resume) identifier and a release cause, so that the user equipment enters a suspend mode. In this case, the base station reserves information such as a radio access bearer and a related security configuration that are used by the user equipment in the RRC connected mode. When the user equipment needs to transmit data, in other words, the user equipment needs an RRC connection, the user equipment only needs to send a resume request carrying the resume identifier to the base station, and the base station may identify the user equipment by using the resume identifier, and resume (resume) a status of the user equipment. To be specific, the user equipment and the base station may skip exchanging related configuration information, and directly transmit the data.

In other words, a suspend mode is newly added in the narrowband internet of things scenario. When receiving the release message that includes the resume identifier and the release cause, the user equipment enters the suspend mode. To be specific, it is considered that the user equipment is in a suspend state. However, a base station side reserves the information such as the radio access bearer and the related security configuration of the user equipment in the suspend state. If the user equipment needs to switch from the suspend mode to the RRC connected mode to transmit data, the user equipment needs to first initiate a status resumption procedure, to be specific, the user equipment sends the resume identifier to the base station, so that the base station resumes the information such as the radio access bearer and the security configuration corresponding to the user equipment.

To facilitate understanding of the embodiments of this application, the following first briefly describes one of system architectures to which the embodiments of this application are applicable. As shown in FIG. 1, the system includes two parts: an access network and a core network. The access network is referred to as an evolved UMTS terrestrial radio access network (Evolved UMTS Terrestrial Radio Access Network, E-UTRAN), and the core network is referred to as an evolved packet core (Evolved Packet Core, EPC).

The E-UTRAN mainly includes network elements such as user equipment and a base station. The EPC mainly includes a mobility management device (Mobility Management Entity, MME), a serving gateway (Serving Gateway, SGW), a public data network gateway (Public Data Network Gateway, PGW), and a policy and charging rules charging unit (Policy and Charging Rules Function, PCRF).

The MME is mainly responsible for signaling processing. A specific function includes access control, mobility management, session management, selection of the SGW and the PGW, and the like.

A main function of the SGW is to route and forward a data packet under control of the MME, to be specific, forwarding received user data to a specified PGW.

A main function of the PGW includes session and bearer management, Internet protocol (Internet Protocol, IP) address allocation, and the like.

The PCRF is mainly used to provide an available measurement and charging control decision.

An IP protocol service is an IP protocol-based service, for example, an IP multimedia subsystem (IP Multimedia Subsystem, IMS) service.

In an E-UTRAN radio interface protocol architecture, a protocol stack is divided into a user plane protocol stack and a control plane protocol stack. A plane for transmitting a service and application data is referred to as the user plane, and the user plane carries application data of a user. For example, content on a web page and chat content that are read by the user when the user accesses the Internet by using a mobile phone are all transmitted by using the user plane.

Link composition of the user plane is shown in FIG. 1. A plane for transmitting signaling information is referred to as the control plane, and the control plane carries interaction control information between the user and a network. For example, when the user accesses the Internet, establishment, maintenance, and release of a link between the user and the network are all completed by using the control plane. Link composition of the control plane is shown in FIG. 1.

A Uu interface is a communications interface between the user equipment and the base station. The Uu interface may be divided into two interfaces. One interface is used for transmission on the control plane, for example, an RRC signaling message. The other interface is used for transmission on the user plane, for example, a broadcast message.

An S1 interface is a communications interface between the base station and the core network, and may be divided into two interfaces. One interface is referred to as an S1-MME interface. The S1-MME interface is an interface between the base station and the mobility management device, and is used for transmission on the control plane, for example, evolved radio access bearer (Evolved Radio Access Bearer, E-RAB) management information. The other interface is referred to as an S1-U interface. The S1-U interface is an interface between the base station and the serving gateway, and is used for transmission on the user plane, for example, hypertext transfer protocol data.

An S11 interface is a communications interface between the mobility management device and the serving gateway, and is used for transmission on the control plane, for example, instructions such as creating a session and deleting a session.

An S5 interface is a communications interface between the serving gateway and the public data network gateway. The S5 interface may be divided into two interfaces. One interface is used for transmission on the control plane, and the other interface is used for transmission on the user plane. An S8 interface is a communications interface between the serving gateway and the public data network gateway during roaming. The S8 interface may also be divided into two interfaces. One interface is used for transmission on the control plane, and the other interface is used for transmission on the user plane.

A Gx interface is a communications interface between the public data network gateway and the PCRF, and is used for transmission on the control plane.

An Rx interface is a communications interface between the PCRF and an external Internet, and is used for transmission on the control plane.

An SGi interface is a communications interface between the public data network gateway and the external Internet, and is used for transmission on the user plane.

It should be understood that the mobility management device in FIG. 1 is only a name, and the name does not limit the device. For example, the "mobility management device" may be replaced with a "mobility management node", a "mobility management entity", or another name. In addition, the mobility management device may be corresponding to a device including another function in addition to a mobility management function. A unified description is provided herein, and details are not described below again.

Figure 2:
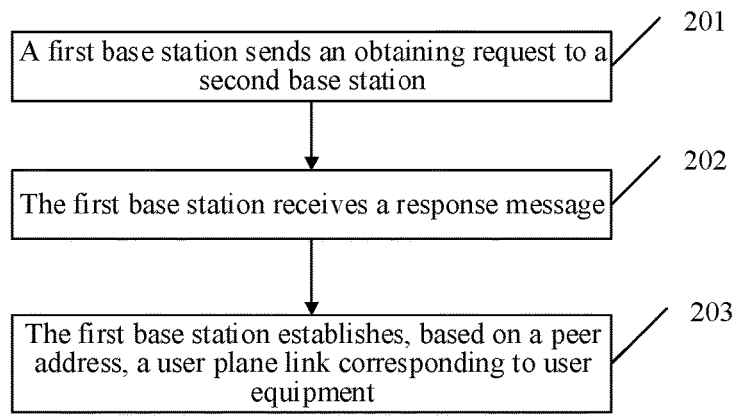
FIG. 2 is a flowchart of an embodiment of a user plane link establishment method according to an embodiment of this application.

The following first describes a user plane link establishment method in the embodiments of this application. Referring to FIG. 2, an embodiment of the user plane link establishment method in the embodiments of this application includes the following steps.

201. A first base station sends an obtaining request to a second base station.

When user equipment meets a suspend condition, the second base station delivers a release message to enable the user equipment to enter a suspend mode, in other words, enabling the user equipment to be in a suspend state. It should be understood that the release message carries a resume identifier corresponding to the user equipment.

When the user equipment is attached to the first base station and needs to transmit data, the user equipment initiates a status resumption procedure. Specifically, the user equipment adds, to a resume request, the resume identifier corresponding to the user equipment, and transmits the resume request to the first base station. After receiving the request, the first base station sends the obtaining request to the second base station. The obtaining request includes the resume identifier.

It should be understood that the resume identifier is usually 40-bit data, where the first 20 bits of the data are used to identify a suspend site, and the last 20 bits of the data are defined by the suspend site. The suspend site in this embodiment of this application refers to the second base station.

202. The first base station receives a response message.

After receiving the obtaining request, the second base station determines the user equipment corresponding to the resume identifier, determines a peer address corresponding to the user equipment, and then sends the response message to the first base station. The response message includes the peer address. The first base station receives the response message, and obtains the peer address.

It should be understood that, in this embodiment of this application, the peer address is an address of a network element at a core network end on a user plane that corresponds to the user equipment. Specifically, in an LTE network, the peer address is a peer address of an S1-U interface. However, in another communications network, the peer address may be a peer address of another interface. This is not specifically limited herein.

203. The first base station establishes, based on the peer address, a user plane link corresponding to the user equipment.

After obtaining the peer address, the first base station establishes a communication connection between the first base station and the network element corresponding to the peer address, in other words, establishing the user plane link corresponding to the user equipment.

In this embodiment of this application, in a process in which the first base station resumes a status of the suspended user equipment, the first base station may obtain the peer address, and establish, based on the peer address, the user plane link corresponding to the user equipment, so that the user equipment can normally transmit service data.

Figure 3:
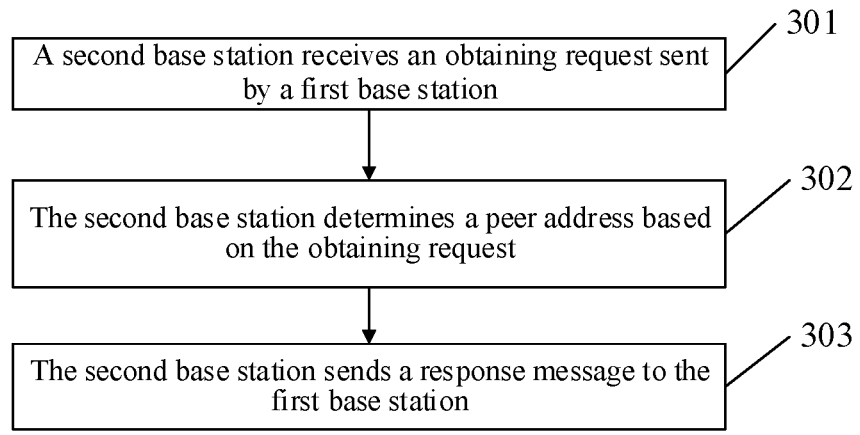
FIG. 3 is a flowchart of another embodiment of a user plane link establishment method according to an embodiment of this application.

The foregoing describes the user plane link establishment method in the embodiments of this application from a perspective of the first base station. The following describes the user plane link establishment method in the embodiments of this application from a perspective of the second base station. Referring to FIG. 3, another embodiment of the user plane link establishment method in the embodiments of this application includes the following steps:

301. A second base station receives an obtaining request sent by a first base station.

When the first base station determines that a suspend site corresponding to user equipment is the second base station, and needs to resume a status of the user equipment, the first base station sends the obtaining request to the second base station, and the second base station receives the obtaining request. The obtaining request carries a resume identifier corresponding to the user equipment.

It should be understood that the resume identifier is usually 40-bit data, where the first 20 bits of the data are used to identify the suspend site, and the last 20 bits of the data are defined by the suspend site. The suspend site in this embodiment of this application refers to the second base station.

302. The second base station determines a peer address based on the obtaining request.

After receiving the obtaining request, the second base station identifies the resume identifier carried in the obtaining request, determines the user equipment corresponding to the resume identifier, and then determines an address of a network element at a core network end on a user plane link that is used to transmit data of the user equipment, namely, the peer address. Specifically, in an LTE network, the peer address is a peer address of an S1-U interface. However, in another communications network, the peer address may be a peer address of another interface. This is not specifically limited herein.

303. The second base station sends a response message to the first base station.

After determining the peer address of the user equipment, the second base station adds the peer address to the response message, and then sends the response message to the first base station. After receiving the response message, the first base station may establish a user plane link between the first base station and the network element corresponding to the peer address.

In this embodiment of this application, in a process in which the first base station resumes a status of the user equipment, the second base station sends the peer address to the first base station, so that the first base station can establish, based on the peer address, the user plane link corresponding to the user equipment, and the user equipment can normally transmit service data.

Figure 4:
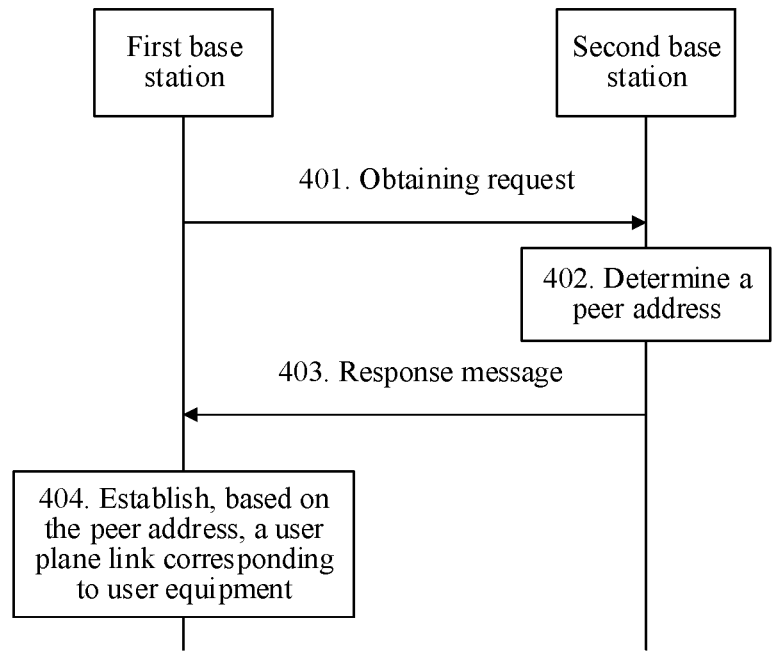
FIG. 4 is a flowchart of another embodiment of a user plane link establishment method according to an embodiment of this application.

To facilitate understanding of the embodiments of this application, the following describes the user plane link establishment method in the embodiments of this application by using an interaction embodiment. Referring to FIG. 4, another embodiment of the user plane link establishment method in the embodiments of this application includes the following steps.

401. A first base station sends an obtaining request to a second base station.

When user equipment meets a suspend condition, the second base station delivers a release message to enable the user equipment to enter a suspend mode, in other words, enabling the user equipment to be in a suspend state. In addition, the second base station allocates a resume identifier to the user equipment that needs to enter the suspend state, and adds the resume identifier to the release message.

When the user equipment is attached to the first base station and needs to transmit data, the user equipment initiates a status resumption procedure. Specifically, the user equipment adds, to an RRC connection request, the resume identifier corresponding to the user equipment, and transmits the RRC connection request to the first base station. After receiving the request, the first base station sends the obtaining request to the second base station. The obtaining request is used to obtain context information of the user equipment, and the obtaining request includes the resume identifier.

It should be understood that the obtaining request may specifically be a retrieve UE context request (retrieve UE context request), or may be another request. This is not specifically limited herein.

It should be further understood that in this embodiment of this application, the first base station and the second base station may communicate with each other through an X2 interface, or may communicate with each other in another manner. This is not specifically limited herein.

402. The second base station determines a peer address based on the obtaining request.

After receiving the obtaining request of the first base station, the second base station determines the context information of the user equipment based on the resume identifier in the obtaining request. In addition, the second base station further determines an address of a network element at a core network end on a user plane that corresponds to the user equipment, namely, the peer address.

403. The second base station sends a response message to the first base station.

After determining the context information and the peer address, the second base station adds the context information and the peer address to the response message, and then sends the response message including the context information and the peer address to the first base station. In this embodiment of this application, the response message may be a retrieve UE context response (retrieve UE context response), or may be another message. This is not specifically limited herein.

Specifically, the second base station may add one or more extension information elements to the response message, and then add the peer address to the extension information element.

The extension information element may be uplink general packet radio service tunneling protocol (General Packet Radio Service Tunneling Protocol, GTP) tunnel node information, or may be other information, for example, a newly defined information element specially used to indicate the peer address, or another information element that also has a peer address indication function and that exists in a system. This is not listed one by one herein.

It should be understood that the extension information element may be an information element in the context information, or may be another information element independent of the context information. This is not specifically limited herein. In other words, in this embodiment of this application, the peer address may be included in the context information and sent to the first base station, or the peer address and the context information may be separated, and the context information and the peer address are sent to the first base station simultaneously.

It should be understood that in an abstract syntax notation (Abstract Syntax Notation One, ASN.1) protocol, an uplink GTP tunnel node is defined as an SGW node connected to an S1 interface, and is used to transmit an uplink packet data unit (packet data unit, PDUs). In other words, the uplink GTP tunnel node may be used to indicate the peer address. The peer address may specifically be an IP address of the SGW. It should be noted that in addition to the IP address of the SGW, the peer address may specifically be an address of a network element that is used to transmit user plane data with the base station in a core network. This is not specifically limited herein.

It should be noted that in this embodiment of this application, the context information may include an E-RAB that needs to be established, an identifier of the E-RAB, and a quality of service parameter or a bearer type of each E-RAB level, and may further include other information. This is not specifically limited herein. The information and the uplink GTP tunnel node information may be carried in the response message as content in an E-RAB establishment list. In addition to the context information and the uplink GTP tunnel node information, the response message may further include other information used to respond to the obtaining request. This is not limited herein.

404. The first base station establishes, based on the peer address, a user plane link corresponding to the user equipment.

After receiving the response message sent by the second base station, the first base station resumes a status of the user equipment, so that the user equipment is resumed to a status before suspension. Specifically, the first base station may resume information such as a radio access bearer and a security configuration of the user equipment based on the context information in the response message, and further establish the user plane link between the first base station and the network element corresponding to the peer address.

Specifically, the first base station may determine a target SGW in the core network based on the peer address indicated by the uplink GTP tunnel node information, and then establish the user plane link between the first base station and the target SGW through an S1-U interface.

In addition, in a process in which the first base station resumes the status of the user equipment, the first base station may further send a link switch request (link switch request) to a mobility management device in the core network, so that a core network side can successfully update user plane link switch information.

After the first base station successfully establishes the user plane link, and the user plane link switch information is updated on the core network side, the user equipment may transmit service data by using the user plane link. For example, when a user accesses the Internet by using a mobile phone, the mobile phone sends an Internet access request to the first base station, the first base station sends the Internet access request to the target SGW by using the user plane link, the target SGW transmits the Internet access request to a corresponding server under control of the MME, and then the server returns, to the mobile phone by using the user plane link, a resource corresponding to the Internet access request, so that the user can normally access the Internet.

In this embodiment of this application, in a process in which the first base station resumes the status of the user equipment, the second base station sends the peer address to the first base station, so that the first base station can establish, based on the peer address, the user plane link corresponding to the user equipment, and the user equipment can normally transmit service data.

In addition, this embodiment of this application provides a plurality of manners of sending the peer address to the first base station, thereby improving flexibility of the solution.

Figure 5:
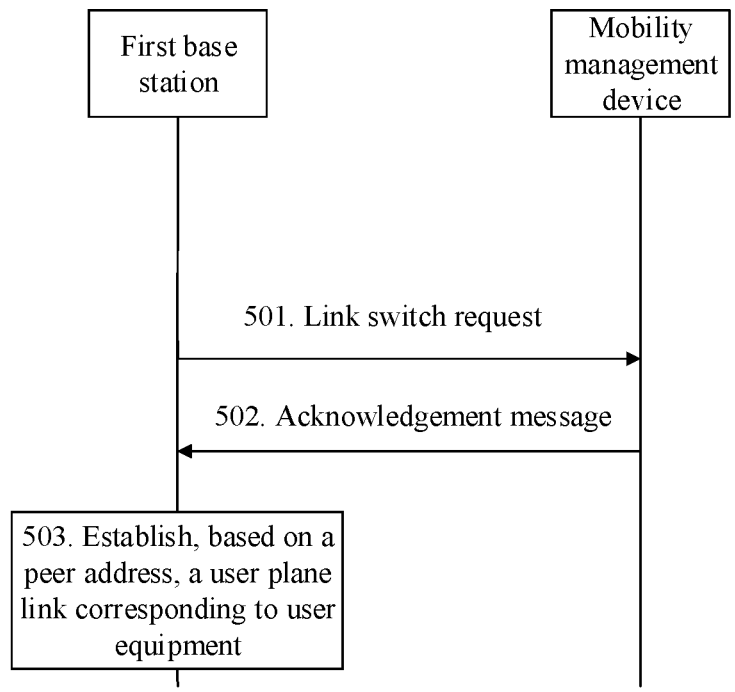
FIG. 5 is a flowchart of another embodiment of a user plane link establishment method according to an embodiment of this application.

An embodiment of this application further provides another user plane link establishment method. Referring to FIG. 5, another embodiment of the user plane link establishment method in the embodiments of this application includes the following steps.

501. A first base station sends, to a mobility management device, a link switch request corresponding to user equipment.

When the user equipment in a suspend state needs to transmit data, the user equipment requests the first base station to resume a status of the user equipment. In a process in which the first base station resumes the status of the user equipment, the first base station sends, to the mobility management device, the link switch request (path switch request) corresponding to the user equipment, to be specific, requesting to change a service data transmission channel corresponding to the user equipment.

502. The first base station receives an acknowledgement message corresponding to the link switch request.

After receiving the link switch request, the mobility management device updates user plane link switch information based on the link switch request, to be specific, switching a node in a radio access bearer corresponding to the user equipment from the second base station to the first base station. After the switching succeeds, the mobility management device sends a link switch request acknowledgement message (path switch request acknowledge) to the first base station. The acknowledgement message includes a peer address.

It should be understood that, in this embodiment of this application, the peer address is an address of a network element at a core network end on a user plane that corresponds to the user equipment. Specifically, in an LTE network, the peer address is a peer address of an S1-U interface. However, in another communications network, the peer address may be a peer address of another interface. This is not specifically limited herein. More specifically, the peer address may be an IP address of an SGW, or may be an address of another network element. This is not specifically limited herein.

It should be noted that the link switch request acknowledgement message includes an evolved radio access bearer (Evolved Radio Access Bearer, E-RAB) switch uplink list, and the E-RAB switch uplink list includes uplink bearer information. In this embodiment of this application, a transport layer address in the uplink bearer information is the peer address in this embodiment of this application. It should further be understood that, in addition to the transport layer address, the uplink bearer information may further include other information such as an E-RAB identifier and a GTP tunnel endpoint identifier. This is not specifically limited herein.

503. The first base station establishes, based on the peer address, a user plane link corresponding to the user equipment.

After receiving the acknowledgement message, the first base station may establish the user plane link between the first base station and the network element corresponding to the peer address. Specifically, the first base station may determine a target SGW based on the transport layer address in the uplink bearer information, establish the user plane link between the first base station and the target SGW through the S1-U interface, and then the user equipment may transmit service data to a core network by using the user plane link.

In this embodiment of this application, the first base station may obtain the peer address in the link switch acknowledgement message returned by the mobility management device, and then establish, based on the peer address, the user plane link corresponding to the user equipment, so that the user equipment can normally transmit service data.

Figure 6:
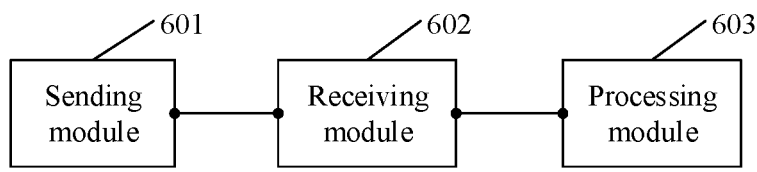
FIG. 6 is a schematic diagram of an embodiment of a base station according to an embodiment of this application.

The foregoing describes the user plane link establishment method in the embodiments of this application. The following describes a base station in the embodiments of this application. Referring to FIG. 6, an embodiment of the base station in the embodiments of this application includes:

a sending module 601, configured to send an obtaining request to a second base station;

a receiving module 602, configured to receive a response message, where the response message includes a peer address; and a processing module 603, configured to establish, based on the peer address received by the receiving module 602, a user plane link corresponding to user equipment.

In the embodiment corresponding to FIG. 6, a procedure executed by the modules in the base station is similar to the method procedures described in the embodiments shown in FIG. 2 and FIG. 4. Details are not described herein again.

In this embodiment of this application, in a process in which the base station resumes a status of suspended user equipment, the base station may obtain the peer address by using the receiving module 602, and the processing module 603 may establish, based on the peer address, the user plane link corresponding to the user equipment, so that the user equipment can normally transmit service data.

It should be understood that, based on the base station corresponding to FIG. 6, in another embodiment of the base station in the embodiments of this application, the response message may include an extension information element, and the extension information element is used to indicate the peer address. Specifically, the extension information element may be an information element in context information, or may be another information element independent of the context information. More specifically, the extension information element may be uplink GTP tunnel node information, or may be other information. This is not specifically limited herein.

Figure 7:
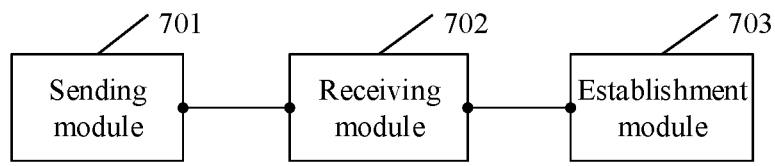
FIG. 7 is a schematic diagram of another embodiment of a base station according to an embodiment of this application.

It should be understood that, based on the base station corresponding to FIG. 6, in another embodiment of the base station in the embodiments of this application, the peer address may include an Internet protocol address of a serving gateway. Referring to FIG. 7, another embodiment of the base station provided in the embodiments of this application includes:

a sending module 701, configured to send, to a mobility management device, a link switch request corresponding to user equipment;

a receiving module 702, configured to receive an acknowledgement message corresponding to the link switch request, where the acknowledgement message includes a peer address; and an establishment module 703, configured to establish, based on the peer address received by the receiving module 702, a user plane link corresponding to the user equipment.

In the embodiment corresponding to FIG. 7, a procedure executed by the modules in the base station is similar to the method procedure described in the embodiment shown in FIG. 5. Details are not described herein again.

In this embodiment of this application, a first base station may obtain, by using the receiving module 702, the peer address in the link switch acknowledgement message returned by the mobility management device. Then, the establishment module 703 may establish, based on the peer address, the user plane link corresponding to the user equipment, so that the user equipment can normally transmit service data.

It should be understood that, based on the base station corresponding to FIG. 7, in another embodiment of the base station in the embodiments of this application, the peer address may include an Internet protocol address of a serving gateway.

Figure 8:
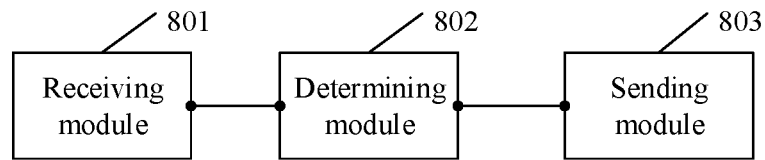
FIG. 8 is a schematic diagram of another embodiment of a base station according to an embodiment of this application.

Referring to FIG. 8, another embodiment of the base station provided in the embodiments of this application includes:

a receiving module 801, configured to receive an obtaining request sent by a first base station;

a determining module 802, configured to determine a peer address based on the obtaining request received by the receiving module 801; and a sending module 803, configured to send a response message to the first base station, where the response message includes the peer address.

In the embodiment corresponding to FIG. 8, a procedure executed by the modules in the base station is similar to the method procedures described in the embodiments shown in FIG. 3 and FIG. 4. Details are not described herein again.

In this embodiment of this application, in a process in which the first base station resumes a status of the user equipment, a second base station sends the peer address to the first base station by using the sending module 803, so that the first base station can establish, based on the peer address, a user plane link corresponding to the user equipment, and the user equipment can normally transmit service data.

It should be understood that, based on the base station corresponding to FIG. 8, in another embodiment of the base station in the embodiments of this application, the base station may further include:

a carrying module, configured to add an extension information element to the response message, where the extension information element is used to indicate the peer address.

Specifically, the extension information element may be an information element in context information, or may be another information element independent of the context information. More specifically, the extension information element may be uplink GTP tunnel node information, or may be other information. This is not specifically limited herein.

It should be understood that, based on the base station corresponding to FIG. 8, in another embodiment of the base station in the embodiments of this application, the peer address may include an Internet protocol address of a serving gateway.

Figure 9:
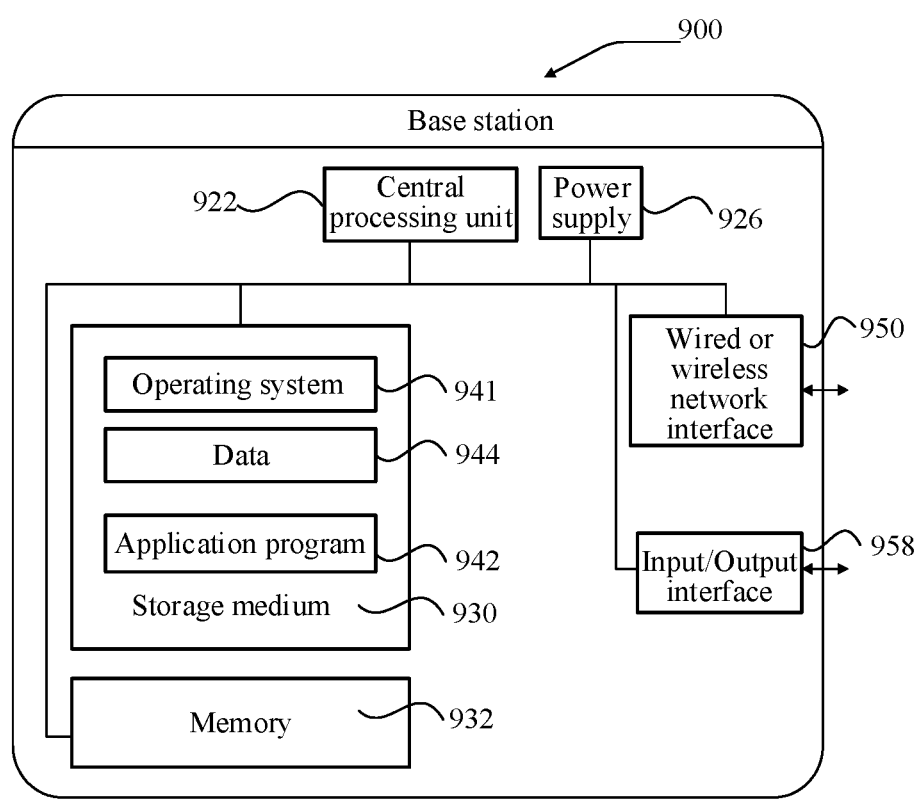
FIG. 9 is a schematic diagram of another embodiment of a base station according to an embodiment of this application.

The foregoing describes the base station in the embodiments of this application from a perspective of a function module, and the following describes the base station in the embodiments of this application from a perspective of entity hardware. FIG. 9 is a schematic structural diagram of a base station according to an embodiment of this application, the base station 900 may vary greatly due to different configurations or performance, and may include one or more central processing units (central processing units, CPU) 922 (for example, one or more processors) and a memory 932, and one or more storage media 930 (for example, one or more mass storage devices) that store an application program 942 or data 944. The memory 932 and the storage medium 930 may be used for temporary storage or permanent storage. The program stored in the storage medium 930 may include one or more modules (not shown in the figure), and each module may include a series of instruction operations for the base station. Further, the central processing unit 922 may be configured to communicate with the storage medium 930 to perform, on the base station 900, a series of instruction operations in the storage medium 930.

The base station 900 may further include one or more power supplies 926, one or more wired or wireless network interfaces 950, one or more input/output interfaces 958, and/or one or more operating systems 941 such as Windows Server™, Mac OS X™, Unix™, Linux™, and FreeBSD™.

The steps performed by the base station in the embodiments shown in FIG. 2 to FIG. 5 may be based on the base station structure shown in FIG. 9.

An embodiment of this application further provides a computer-readable storage medium. The computer-readable storage medium is configured to store a computer software instruction used by the base station in the embodiments of this application, and the computer-readable storage medium includes a program designed for the base station.

The base station may be the base station described in the embodiments shown in FIG. 2 to FIG. 5.

An embodiment of this application further provides a computer program product. The computer program product includes a computer software instruction. The computer software instruction may be loaded by a processor to implement a procedure of the user plane link establishment method in any one of FIG. 2 to FIG. 5.

All or some of the foregoing embodiments may be implemented by using software, hardware, firmware, or any combination thereof. When the embodiments are implemented by using software, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid-state disk Solid State Disk (SSD)), or the like.

It may be clearly understood by persons skilled in the art that, for convenient and brief description, for a specific working process of the foregoing system, apparatus, and unit, refer to a corresponding process in the foregoing method embodiments. Details are not described herein.

In the several embodiments provided in this application, it should be understood that the disclosed system, apparatus, and method may be implemented in another manner. For example, the foregoing apparatus embodiment is only an example. For example, the unit division is merely logical function division and may be other division during actual implementation. For example, a plurality of units or components may be combined or integrated into another system, or some features may be ignored or not performed. In addition, the indicated or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (English full name: Read-Only Memory, ROM for short), a random access memory (English full name: Random Access Memory, RAM for short), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A user plane link establishment method, comprising:
   sending, by a first base station, an obtaining request to a second base station, wherein the obtaining request comprises a resume identifier associated with user equipment;
   receiving, by the first base station, a response message corresponding to the obtaining request from the second base station, wherein the response message comprises a peer address, wherein the peer address is determined based on the resume identifier, and wherein the peer address is indicated by uplink general packet radio service (GPRS) tunneling protocol (GTP) tunnel node information; and
   in response to receiving the response message from the second base station, establishing, by the first base station and based on the peer address, a user plane link corresponding to the user equipment.

2. The method according to claim 1, wherein the response message comprises context information of the user equipment, and wherein the GTP tunnel node information is an information element in the context information.

3. The method according to claim 1, wherein before sending the obtaining request, the method further comprises:
   receiving, by the first base station, a resume request from the user equipment, wherein the resume request comprises the resume identifier, and wherein the resume identifier is obtained in a release message from the second base station.

4. The method according to claim 1, wherein the peer address comprises an Internet protocol (IP) address of a serving gateway (SGW).

5. The method according to claim 1, wherein the peer address is a peer address of an S1-U interface between the first base station and a serving gateway (SGW), and wherein the S1-U interface is used for hypertext transfer protocol data transmission on the established user plane link.

6. A user plane link establishment method, comprising:
   receiving, by a second base station, an obtaining request from a first base station, wherein the obtaining request comprises a resume identifier associated with user equipment;
   determining, by the second base station, a peer address based on the resume identifier, wherein the peer address is a peer address of an S1-U interface between the first base station and a serving gateway (SGW); and
   sending, by the second base station, a response message to the first base station, wherein the response message comprises the peer address, and wherein the peer address is indicated by uplink general packet radio service (GPRS) tunneling protocol (GTP) tunnel node information.

7. The method according to claim 6, wherein the response message comprises context information of the user equipment, and wherein the GTP tunnel node information is an information element in the context information.

8. The method according to claim 6, wherein before receiving the obtaining request, the method further comprises:
   transmitting, by the second base station, a release message to the user equipment, wherein the release message comprises the resume identifier.

9. The method according to claim 6, wherein the peer address comprises an Internet protocol (IP) address of the SGW.

10. A base station, comprising:
    a transmitter, the transmitter configured to send an obtaining request to a second base station, wherein the obtaining request comprises a resume identifier associated with user equipment;
    a receiver, the receiver configured to receive a response message corresponding to the obtaining request from the second base station, wherein the response message comprises a peer address, wherein the peer address is determined based on the resume identifier, and wherein the peer address is indicated by uplink general packet radio service (GPRS) tunneling protocol (GTP) tunnel node information;
    at least one processor; and
    one or more memories coupled to the at least one processor and storing programming instructions for execution by the at least one processor to establish, based on the peer address, a user plane link corresponding to the user equipment in response to receiving the response message from the second base station.

11. The base station according to claim 10, wherein the response message comprises context information of the user equipment, and wherein the GTP tunnel node information is an information element in the context information.

12. The base station according to claim 10, wherein the receiver is further configured to receive a resume request from the user equipment, wherein the resume request comprises the resume identifier, and wherein the resume identifier is obtained in a release message from the second base station.

13. The base station according to claim 10, wherein the peer address comprises an Internet protocol (IP) address of a serving gateway (SGW).

14. The base station according to claim 10, wherein the peer address is a peer address of an S1-U interface between the base station and a serving gateway (SGW), and wherein the S1-U interface is used for hypertext transfer protocol data transmission on the established user plane link.

* * * * *